United States Patent
Yu et al.

(10) Patent No.: US 11,860,602 B2
(45) Date of Patent: Jan. 2, 2024

(54) INSPECTION PROGRAM EDITING ENVIRONMENT WITH AUTOMATIC TRANSPARENCY OPERATIONS FOR OCCLUDED WORKPIECE FEATURES

(71) Applicant: Mitutoyo Corporation, Kanagawa-ken (JP)

(72) Inventors: Dahai Yu, Redmond, WA (US); Barry Saylor, Issaquah, WA (US); Kai Kircher, Kent, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 1097 days.

(21) Appl. No.: 16/316,319

(22) PCT Filed: Dec. 10, 2018

(86) PCT No.: PCT/US2018/064713
§ 371 (c)(1),
(2) Date: Jan. 8, 2019

(87) PCT Pub. No.: WO2019/133234
PCT Pub. Date: Jul. 4, 2019

(65) Prior Publication Data
US 2021/0325844 A1  Oct. 21, 2021

Related U.S. Application Data

(60) Provisional application No. 62/611,833, filed on Dec. 29, 2017.

(51) Int. Cl.
*G05B 19/401* (2006.01)
*G05B 19/4069* (2006.01)
(Continued)

(52) U.S. Cl.
CPC .......... *G05B 19/401* (2013.01); *G01B 5/008* (2013.01); *G05B 19/4069* (2013.01);
(Continued)

(58) Field of Classification Search
CPC ......... G06T 15/20; G06T 15/40; G06V 10/26; G01B 5/008; G06F 2203/04804;
(Continued)

(56) References Cited

U.S. PATENT DOCUMENTS 4,901,253 A  2/1990  Iwano et al.
4,908,951 A  3/1990  Gurny
(Continued)

FOREIGN PATENT DOCUMENTS

CN  1053894 A  *  8/1991
CN  103678449 A  *  3/2014  ............. G06F 16/54
(Continued)

OTHER PUBLICATIONS

Niklas Elmqvist and Philippas Tsigas, "A Taxonomy of 3D Occlusion Management for Visualization", published in IEEE Transactions on Visualizations and Computer Graphics, vol. 14, No. 5, Sep./Oct. 2008, retrieved Apr. 26, 2022. (Year: 2008).*
(Continued)

*Primary Examiner* — Shourjo Dasgupta
(74) *Attorney, Agent, or Firm* — Seed IP Law Group LLP

(57) ABSTRACT

A system is provided for programming workpiece feature inspection operations for a coordinate measuring machine. The system includes a user interface with a simulation portion (e.g., including a 3D view of a workpiece) and an editing user interface portion (e.g., including an editable plan representation of a current workpiece feature inspection plan). Transparency operations are performed including automatically identifying as a target feature a workpiece feature in the 3D view that corresponds to a workpiece
(Continued)

feature or inspection operation representation in the editable plan representation that is indicated by a current feature-directed operation (e.g., a selection operation for selecting a workpiece feature or inspection operation in the editable plan representation). An occluding workpiece feature that would otherwise be occluding at least a portion of the target feature in the 3D view is then automatically rendered as at least partially transparent in the 3D view.

21 Claims, 8 Drawing Sheets

(51) Int. Cl.
*G05B 19/4097* (2006.01)
*G01B 5/008* (2006.01)
*G06F 3/0481* (2022.01)
*G06V 10/26* (2022.01)
*G06T 15/20* (2011.01)
*G06T 15/40* (2011.01)

(52) U.S. Cl.
CPC ....... *G05B 19/4097* (2013.01); *G06F 3/0481* (2013.01); *G06T 15/20* (2013.01); *G06T 15/40* (2013.01); *G05B 2219/37443* (2013.01); *G06F 2203/04804* (2013.01); *G06V 10/26* (2022.01)

(58) Field of Classification Search
CPC ........ G06F 3/0481; G05B 2219/37443; G05B 19/401; G05B 19/4069; G05B 19/4097
See application file for complete search history.

(56) References Cited

U.S. PATENT DOCUMENTS

| | | | |
|---|---|---|---|
| 5,465,221 A | 11/1995 | Merat et al. | |
| 5,471,406 A | 11/1995 | Breyer et al. | |
| 5,651,107 A * | 7/1997 | Frank | G06F 3/0481 345/589 |
| 7,058,472 B2 | 6/2006 | Mathews et al. | |
| 7,146,291 B2 | 12/2006 | Hough | |
| 7,652,275 B2 | 1/2010 | Gladnick | |
| 7,663,620 B2 | 2/2010 | Robertson et al. | |
| 7,783,445 B2 | 8/2010 | McLean et al. | |
| 7,983,473 B2 | 7/2011 | Tigges | |
| 8,028,085 B2 | 9/2011 | Elien et al. | |
| 8,302,031 B1 | 10/2012 | Sang | |
| 8,314,790 B1 * | 11/2012 | Zeiger | G06T 19/00 345/592 |
| 8,438,746 B2 | 5/2013 | Usui | |
| 9,013,574 B2 | 4/2015 | Saylor et al. | |
| 9,317,746 B2 * | 4/2016 | Shoemaker | G09G 5/14 |
| 9,639,083 B2 | 5/2017 | Tseo et al. | |
| 9,646,425 B2 | 5/2017 | Yu et al. | |
| 10,094,650 B2 * | 10/2018 | Todeschini | H04N 13/204 |
| 10,176,520 B2 * | 1/2019 | Kasik | G06T 17/10 |
| 10,466,854 B2 * | 11/2019 | Harvey | G06F 3/04817 |
| 11,497,569 B2 * | 11/2022 | Liu | G06F 3/04883 |
| 2005/0122323 A1 * | 6/2005 | Huang | G06T 15/40 345/421 |
| 2005/0171733 A1 | 8/2005 | Hough | |
| 2005/0210444 A1 | 9/2005 | Gibson et al. | |
| 2006/0050091 A1 * | 3/2006 | Shoemaker | G06T 15/20 345/661 |
| 2010/0114635 A1 | 5/2010 | Watanabe et al. | |
| 2011/0063288 A1 | 3/2011 | Valadez | |
| 2012/0290269 A1 * | 11/2012 | Kuo | G16H 50/50 703/1 |
| 2013/0249906 A1 * | 9/2013 | Gunderson | G06T 15/20 345/420 |
| 2014/0351767 A1 | 11/2014 | Linder et al. | |
| 2015/0130788 A1 | 5/2015 | Bailiang | |
| 2015/0169790 A1 | 6/2015 | Tseo et al. | |
| 2015/0248211 A1 * | 9/2015 | Johnson | G06F 30/00 715/848 |
| 2016/0005238 A1 | 1/2016 | Bailiang | |
| 2016/0298958 A1 | 10/2016 | Yu et al. | |
| 2016/0299493 A1 | 10/2016 | Yu et al. | |
| 2016/0370165 A1 | 12/2016 | Kelley et al. | |
| 2017/0090742 A1 | 3/2017 | Ade et al. | |
| 2017/0131866 A1 * | 5/2017 | Arques | G06T 17/00 |
| 2018/0089391 A1 * | 3/2018 | Kuo | A61C 9/004 |

FOREIGN PATENT DOCUMENTS

| | | | | |
|---|---|---|---|---|
| CN | 104897091 A | * | 9/2015 | ............ G01B 11/00 |
| CN | 105389321 A | * | 3/2016 | ............ G06F 16/93 |
| CN | 106910244 A | | 6/2017 | |
| CN | 106991205 A | | 7/2017 | |
| EP | 1 330 686 B1 | | 12/2006 | |
| JP | 2011150692 A | * | 8/2011 | |
| WO | WO-2015106829 A1 | * | 7/2015 | ........... G01B 11/005 |

OTHER PUBLICATIONS

Sebastian Knodel et al, "Interactive Generation and Modification of Cutaway Illustrations for Polygonal Models", submitted on Jun. 8, 2009 to https://hal.inria.fr/inria-00392710, retrieved Apr. 26, 2023. (Year: 2009).*
Wilmot Li et al, "Interactive Cutaway Illustrations of Complex 3D Models", ACM Transactions on Graphics, vol. 26, No. 3, article 31, Jul. 2007, retrieved Apr. 26, 2023. (Year: 2007).*
Chris Colfin et al, "Interactive Perspective Cut-away Views for General 3D Scenes", IEEE Symposium on 3D User Interfaces 2006, Mar. 25-26, 2006, Alexandria, Virginia, USA, retrieved Apr. 26, 2023. (Year: 2006).*
Niklas Elmqvist et al., "Employing Dynamic Transparency for 3D Occlusion Management: Design Issues and Evaluation", Human-Computer Interaction- INTERACT 2007 Conference, 11th IFIP TC 13 International Conference, Rio de Janeiro, Brazil, Sep. 10-14, 2007, retrieved Apr. 26, 2023. (Year: 2007).*
International Search Report, dated Mar. 22, 2019, for International Application No. PCT/US2018/064713, 23 pages.
Elmqvist et al., "Employing Dynamic Transparency for 3D Occlusion Management: Design Issues and Evaluation.," *IFIP Conference on Human-Computer Interaction*, Sep. 25-29, Bombay, India, pp. 532-545, 2007.
Kalkofen et al., "Adaptive Ghosted Views for Augmented Reality," *IEEE International Symposium on Mixed and Augmented Reality (ISMA)*, Adelaide, Australia, 2013, 9 pages.
Mitutoyo, "Automatic measurement program generation software MiCAT Planner," Bulletin No. 2150, Aug. 2014, 2 pages.
Mitutoyo, "MiCAT Planner | Automatic Part Program Generation," Bulletin No. 2221, Apr. 2015, 12 pages.
Office Action, dated Nov. 8, 2022, for Chinese Patent Application No. 201880068808.X. (30 pages) (with English Translation).
Office Action, dated Jun. 8, 2023, for Chinese Patent Application No. 201880068808.X. (30 pages) (with English Translation).

* cited by examiner

- CMM Workpiece Feature Inspection Operations Programming Portion — 202
  - CAD File Processing Portion — 205
  - Inspection Path/Sequence Manager — 206
  - Plan View Editing User Interface Portion — 210
    - Editable Plan Representation — 214
  - 3D View Portion — 220
  - Program View User Interface Portion — 230
    - Editable Plan Representation — 234
  - First Set Of Feature-Directed Operations Portion — 235
    - Selection Operation — 236A
    - Hover Or Pass-Over Operation — 236B
  - Transparency Operations Portion — 237
  - Editing Operations Portion — 240
    - Include Workpiece Feature — 241A
    - Exclude Workpiece Feature — 241B
    - Delete — 242
    - Undo — 243
    - Sequence Editing — 244
    - CMM Configuration — 245
      - Inspection Plan Modification Notices Portion — 249
  - Other Operations Portion — 250
  - Programming Environment Synchronization/Notices Manager — 260
  - Execution Time Portion — 270
    - Execution Time Indicator Portion — 272
    - Execution Time Calculating Portion — 274
  - Simulation Status and Control Portion — 280
    - Simulation Status Portion — 281
      - Current Time Indicator — 282
      - Graphical Total Time Range Element — 283
      - Current Time Display — 284
    - Simulation Animation Control Portion — 290
      - Start — 291
      - Pause — 292
      - Stop — 293
      - Reset — 294
      - Reverse — 295
      - Loop — 296
      - Increase Speed — 297
      - Decrease Speed — 298

*Fig.2B.*

INSPECTION PROGRAM EDITING ENVIRONMENT WITH AUTOMATIC TRANSPARENCY OPERATIONS FOR OCCLUDED WORKPIECE FEATURES

BACKGROUND

Technical Field

This disclosure relates to precision metrology, and more particularly to editing inspection programs for coordinate measuring machines.

Description of the Related Art

Certain metrology systems including coordinate measurement machines (CMM's) can be utilized to obtain measurements of inspected workpieces and may be controlled at least in part by workpiece feature inspection operations that have been programmed on a computer. One exemplary prior art CMM is described in U.S. Pat. No. 8,438,746, which is hereby incorporated by reference in its entirety. As described in the '746 patent, the CMM includes a probe for measuring a workpiece, a movement mechanism for moving the probe, and a controller for controlling the movement mechanism.

A CMM which includes a surface scanning probe is described in U.S. Pat. No. 7,652,275 (the '275 patent), which is hereby incorporated herein by reference in its entirety. After a scan, a three dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface sampling points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is hereby incorporated herein by reference in its entirety.

In all of the above described CMMs, operations may be programmed for inspecting workpiece features. Such programmed operations may generally be reviewed to see which workpiece features are being inspected and in what order, and may also be edited by adding, removing or otherwise altering particular program element operations that are associated with particular workpiece features. However, in existing CMM programming systems, such reviewing and editing operations are not always easy for a user to perform, view and/or understand. For example, different windows may be provided with different types of information about the programmed operations, and it may difficult to view and/or understand the various effects that certain types of selected elements and/or edits may correspond to and/or produce in the different windows. A need exists for a system and/or user interface features which allow such viewing and understanding in an immediate and intuitive manner during inspection program creation, review and/or editing for a CMM.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for programming workpiece feature inspection operations for a coordinate measuring machine (CMM). The CMM includes at least one sensor used for determining workpiece feature measurement data, a stage for holding a workpiece, with at least one of the sensor or the stage being movable relative to one another, and a CMM control portion. The system includes a computer-aided design (CAD) file processing portion and a user interface. The CAD file processing portion inputs a workpiece CAD file corresponding to a workpiece and analyzes the file to automatically determine inspectable workpiece features on the workpiece corresponding to a plurality of geometric feature types. The user interface includes a workpiece inspection program simulation portion and an editing user interface portion. The workpiece inspection program simulation portion is configurable to display a three dimensional (3D) view including at least one of workpiece features on the workpiece or inspection operation representations corresponding to inspection operations to be performed on workpiece features according to a current workpiece feature inspection plan. The editing user interface portion includes an editable plan representation of the current workpiece feature inspection plan for the workpiece corresponding to the CAD file, with the editable plan representation including at least one of workpiece features or inspection operation representations.

The system is configured to automatically perform a set of transparency operations in response to one or more feature-directed operations included in a first set of feature-directed operations. In various implementations, the first set of feature-directed operations includes a selection operation for a workpiece feature or an inspection operation representation in the editable plan representation. In various implementations, the first set of feature-directed operations may also or alternatively include at least one of a hover or pass-over operation for a workpiece feature or an inspection operation representation in the editable plan representation.

In various implementations, the set of transparency operations includes automatically identifying as a current target feature a workpiece feature in the 3D view that corresponds to a workpiece feature or inspection operation representation that is indicated by a current feature-directed operation included in the first set of feature-directed operations. Once the current target feature is automatically identified, an occluding workpiece feature that would otherwise be occluding at least a portion of the current target feature in the 3D view is automatically rendered as at least partially transparent in the 3D view. When the current feature-directed operation is terminated, the transparency operations associated with the current target feature in the 3D view are automatically terminated.

BRIEF DESCRIPTION OF THE DRAWINGS

FIGS. 2A and 2B are diagrams showing various elements of one implementation of a computing system on which workpiece feature inspection operations may be programmed for the CMM of FIG. 1;

DETAILED DESCRIPTION

Figure 1:
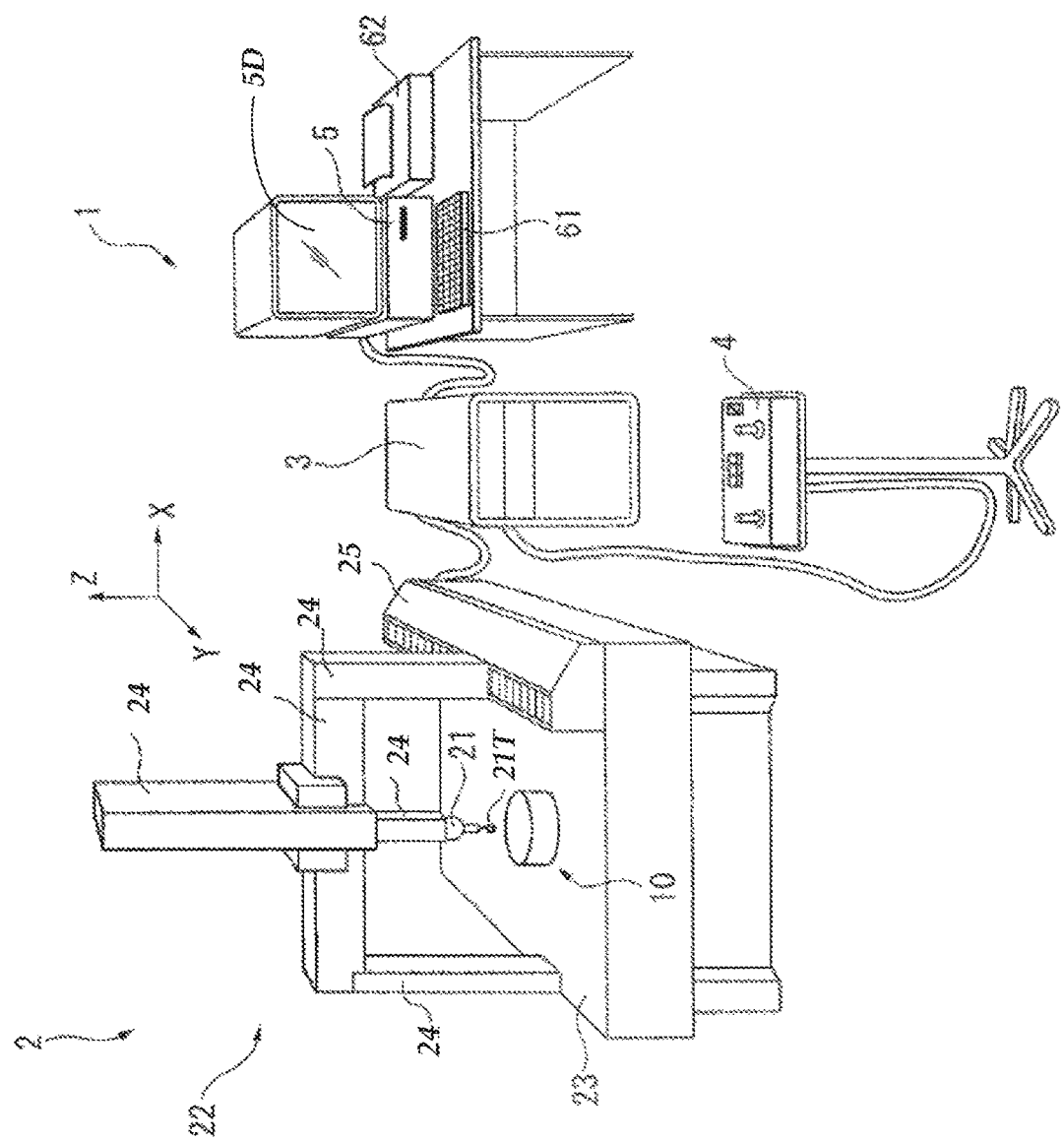
FIG. 1 is a diagram showing various typical components of a metrology system comprising a CMM.

FIG. 1 is a diagram showing various typical components of a metrology system 1 including a generic CMM, which provides one context for application of the principles disclosed herein. Certain aspects of the metrology system 1 are further described in the previously incorporated '746 patent. The metrology system 1 may include: a CMM body 2; a motion controller 3 that controls a drive of the coordinate measuring machine body 2; an operating unit 4 for manually operating the coordinate measuring machine body 2; a host computer 5 that issues commands to the motion controller 3 and executes processing such as for the inspection of features on a workpiece 10 (i.e., an object to be measured) that is disposed on the CMM body 2. A representative input unit 61 and output unit 62 are connected to the host computer 5, as well as a display unit 5D. The display unit 5D may display a user interface, for example, as described in more detail below.

The CMM body 2 may include: a probe 21 having a stylus tip 21T which may contact a surface of the workpiece 10; a movement mechanism 22 that includes a three axis slide mechanism 24 that holds the base end of the probe 21; a measurement stage 23 that holds the workpiece 10 and on which the drive mechanism 25 moves the slide mechanism 24. In various implementations, the drive mechanism 25 may be controlled by a CMM control portion (e.g., including the motion controller 3). As will be described in more detail below, in various implementations one or more sensors of the CMM (e.g., including the probe 21 and/or stylus tip 21T) may be moved relative to the measurement stage 23 (e.g., as controlled by the motion controller 3) and utilized for determining workpiece feature measurement data (e.g., with regard to physical dimensions of features of the workpiece 10).

Figure 2A:
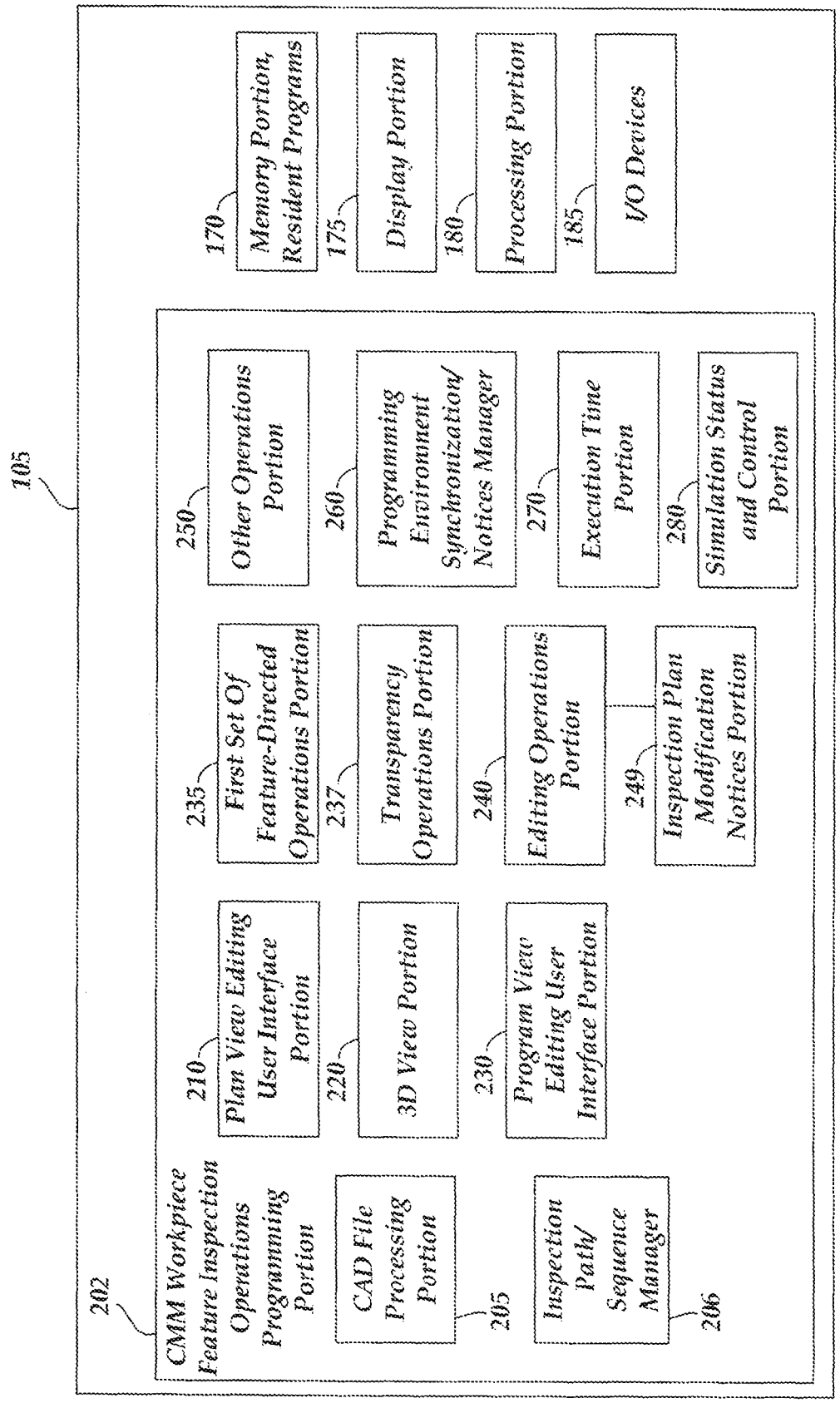

FIGS. 2A and 2B are diagrams of a computing system 105 including various elements of one implementation of a programming system including a programming portion 202 on which workpiece feature inspection operations may be programmed for a CMM (e.g., the CMM body 2 of FIG. 1). As shown in FIG. 2A, in various implementations the computing system 105 (e.g., the computer 5 of FIG. 1 or a separate computer) may include a memory portion 170, a display portion 175, a processing portion 180, an input-output devices portion 185 and the programming portion 202. The memory portion 170 includes resident programs and other data utilized by the computing system 105. The display portion 175 provides the display for the computing system 105 (e.g., similar to the display unit 5D of FIG. 1), including the features provided by the programming portion 202. The processing portion 180 provides for the signal processing and control of the computing system 105, while the input-output devices portion 185 receives and provides control signals and outputs to and from various devices (e.g. the CMM controller 3 of FIG. 1).

As shown in FIGS. 2A and 2B, in one implementation, the programming portion 202 includes a CAD file processing portion 205, an inspection path and/or sequence manager 206, a plan view editing user interface portion 210, a 3D view portion 220, a program view editing user interface portion 230, a first set of feature-directed operations portion 235, a transparency operations portion 237, an editing operations portion 240, which may include an inspection plan modification notices portion 249, another operations portion 250, a programming environment synchronization and/or notices manager 260, an execution time portion 270, and a simulation status and control portion 280. In various implementations, the computer aided design (CAD) file processing portion 205 inputs a workpiece CAD file corresponding to a workpiece (e.g., the workpiece 10 of FIG. 1) and analyzes the file to automatically determine inspectable workpiece features on the workpiece corresponding to a plurality of geometric feature types (e.g., cylinder, plane, sphere, cone, etc.) The inspection path/sequence manager 206 may automatically determine a motion control path that allows the CMM to obtain measurements that characterize the workpiece features.

Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein by reference in its entirety, disclose various methods which may be used to analyze CAD data and determine geometric features of a workpiece and then automatically generate a motion control path for placing a probe or sensor at sampling points that measure or characterize the geometric features. European Patent Number EP1330686 also provides relevant teachings. In some implementations, determining the geometric features may simply comprise extracting or recognizing the categorized geometric features inherently defined in some modern CAD systems. In some implementations, product and manufacturing information (PMI, for short) is present in the CAD data, and may be used in the aforementioned processes. In various implementations, PMI conveys non-geometric attributes in CAD data, and may include geometric dimensions and tolerances, surface finish, and the like. In some implementations, in the absence of PMI, default tolerances and other default inspection rules may be used in automatic operations of the CAD file processing portion 205 and the inspection path/sequence manager 206.

The motion control path may generally define a feature inspection sequence as well as individual inspection sampling points (e.g., touch probe measurement points, or non-contact measurement points, or point cloud determination regions, etc.), as well as the motion/measurement path between such points. Various systems with relevant teachings regarding sampling points and measurement paths are described in U.S. Pat. Nos. 9,013,574; 9,639,083 and 9,646,425, and in U.S. Patent Publication Nos. 2016/0298958 and 2016/0299493, each of which is hereby incorporated herein by reference in its entirety. In various implementations, sequence and motion path planning may follow simple rules that avoid collisions, or more complicated rules or processes that both avoid collisions and optimize motion path length or inspection time, etc. In some implementations, the CAD file processing portion 205 may include the inspection path/sequence manager 206, or they may be merged and/or indistinguishable. Examples of automatic path planning methods may be found in the previously cited references. In various implementations, one or both of the aforementioned automatic processes may be automatically triggered when a target CAD file is identified in the programming portion 202. In other implementations, one or both of the aforementioned automatic processes may be triggered in relation to a target CAD file based on operator input that initiates the processes. In other implementations, similar processes may be semi-automatic and may require user input in the programming portion 202 for certain operations or decisions.

In any case, in various implementations the aforementioned processes may, in effect, be used to provide a comprehensive inspection plan and/or inspection program for a workpiece. In some contexts, the connotations of the term "inspection plan" may encompass primarily what features are to be inspected and what measurements are to be made on each, and in what sequence, and the connotations of the term "inspection program" may primarily encompass how the inspection plan is to be accomplished on a particular CMM configuration (e.g., following the "instructions" inherent in the inspection plan, but also including the motion speeds and path, the probe or sensor to be used, and so on, for a defined CMM configuration.) Other portions of the programming portion 202 may use the results of the CAD file processing portion 205 and the inspection path/sequence manager 206 to perform their operations and populate and/or control their associated user interface portions, and the like. As shown in FIG. 2B, the plan view editing user interface portion 210 includes an editable plan representation 214 of a workpiece feature inspection plan for the workpiece corresponding to the CAD file. In various implementations, the program view editing user interface portion 230 may also (or alternatively) include an editable plan representation 234.

As will be described in more detail below, elements of a workpiece feature inspection plan in the editable plan representation 214 or 234 may generally be reviewed to see which workpiece features are being inspected and in what order, and may also be edited by adding, removing or otherwise altering particular program element operations that are associated with particular workpiece features. In previous CMM programming systems, such reviewing and editing operations have not always been easy for a user to perform, view and/or understand, particularly for relatively unskilled users. For example, as disclosed in certain of the incorporated references, certain prior systems have provided different windows with different types of information about the programmed operations, and for which it has been difficult for users to view and/or understand the various effects and features that certain types of selected elements and/or edits may correspond to and/or produce in the different windows.

In particular, one issue that may arise is with respect to a workpiece feature (e.g., a "target" feature) that is occluded by another workpiece feature in a 3D view (i.e., as displayed by the 3D view portion 220). For example, if a feature-directed operation is performed in the editable plan representation 214 and/or 234 (e.g., a user makes a selection for selecting a workpiece feature in the editable plan representation 214 and/or 234), it may be difficult for the user to view or otherwise visualize the corresponding workpiece feature in the 3D view if the corresponding workpiece feature is occluded by another workpiece feature. As will be described in more detail below, in accordance with features disclosed herein, the transparency operations portion 237 may be configured to automatically identify as a current target feature a workpiece feature in the 3D view that corresponds to a workpiece feature or inspection operation representation that is indicated by a current feature-directed operation (e.g., a selection operation) of the first set of feature-directed operations portion 235. After identifying the target feature, the transparency operations portion 237 may automatically render as at least partially transparent in the 3D view an occluding workpiece feature that would otherwise be occluding at least a portion of the current target feature in the 3D view. The transparency operations portion 237 may further automatically terminate the transparency operations associated with the current target feature in the 3D view when the current feature-directed operation is terminated.

In various implementations, the first set of feature-directed operations portion 235 may include a selection operation 236A and a hover or pass-over operation 236B. For example, the selection operation 236A may include a positioning of a selection indicator relative to a workpiece feature or inspection operation representation in the editable plan representation 214 or 234 and a performance of a selection action (e.g., a clicking of a mouse button, etc.) for selecting the workpiece feature or inspection operation representation in the editable plan representation 214 or 234. In various implementations, the hover or pass-over operation 236B may correspond to a single type of hover or pass-over operation, or may alternatively be implemented as a separate hover operation and a separate pass-over operation, etc. In one implementation, a hover operation may include a positioning of a selection indicator relative to a workpiece feature or inspection operation representation in the editable plan representation 214 or 234 and a hovering of the selection indicator for at least a specified period of time relative to the workpiece feature or inspection operation representation. In one implementation, a pass-over operation may include a moving of a selection indicator to pass over a workpiece feature or inspection operation representation in the editable plan representation 214 or 234. In various implementations, a hover operation and/or a pass-over operation may also be included as a type of selection operation (e.g., wherein a first type of selection operation may require a performance of a selection action, and a second type of selection operation may not require a performance of a selection action in addition to the positioning of the selection indicator). In such a configuration, the hover or pass-over operation 236B may be a sub-operation of the selection operation 236A, or the blocks 236A and 236B may otherwise be merged, etc.

In addition to potentially activating certain transparency operations of the transparency operations portion 237, at least some feature-directed operations of the first set of feature-directed operations portion 235 may be part of or may be utilized to initiate certain editing operations of the editing operations portion 240. For example, when a user is intending to edit a workpiece feature or inspection operation representation in the editable plan representation 214 or 234, the user may first perform a feature-directed operation (e.g., a selection operation 236A) for selecting the workpiece feature or inspection operation representation that is to be edited. In various implementations, portions or all of the first set of feature-directed operations portion 235 and the editing operations portion 240 may be merged and/or indistinguishable.

In various implementations, it is desirable for results and/or related effects of any operations of the first set of feature-directed operations portion 235, transparency operations portion 237 and/or editing operations portion 240, etc. to be immediately reflected in the various portions of the programming portion 202 and its user interface(s). For example, when a user utilizes a selection operation 236A to select a workpiece feature in the editable plan representation 214 or 234, it may be desirable for the transparency operations portion 237 to immediately operate to automatically render as at least partially transparent in the 3D view an occluding workpiece feature that would otherwise be occluding at least a portion of the corresponding target feature in the 3D view. As another example, as described in more detail in the previously incorporated '958 publication, when a user performs various editing operations of the editing operations portion 240, it may be desirable for the corresponding results and/or related effects to be immediately incorporated (e.g., automatically or with very minimal effort by the user) into the current version of the inspection plan and/or inspection program, which is then reflected in the various portions of the programming portion 202 and its user interface(s).

Such features are noted to be in contrast to certain prior systems as described in certain of the incorporated references, in which visualization of the effect of selections, editing changes, etc. to the plan and/or program have not been immediately or continuously available in the user interface (e.g., through a displayed "3D" simulation or moving animation). In such prior systems, it has been typical to require the user to activate a special mode or display window that is not normally active in real time during editing operations in order to see a "recording" or specially generated simulation of the CMM running the edited inspection program. In various implementations, an "immediate" ability to view a selected workpiece feature and/or the editing results in a 3D simulation or animation view may be critical to the evaluation, determination and/or acceptance of an editing operation.

In various implementations, the immediate ability to view a selected workpiece feature and/or editing results in a 3D simulation or animation view may be accomplished at least in part through the operations of the programming environment synchronization/notices manager 260. For example, the programming environment synchronization/notices manager 260 may be utilized in combination with the transparency operations portion 237 and the first set of feature-directed operations portion 235 to perform certain functions. As described above, in various implementations, such functions may include automatically rendering as at least partially transparent in the 3D view an occluding workpiece feature that would otherwise be occluding at least a portion of a current target feature in the 3D view. More specifically, the target feature in the 3D view may correspond to a workpiece feature or inspection operation representation in the editable plan representation 214 or 234 that is indicated by a current feature-directed operation (e.g., a user selection), wherein the correspondence between the workpiece features and inspection operation representations in the editable plan representation 214 or 234 and the workpiece features in the 3D view may be determined at least in part by the programming environment synchronization/notices manager 260.

In various implementations, the programming environment synchronization/notices manager 260 may be implemented at least in part using known "publisher-subscriber" methods, which are sometimes implemented using XML like languages (e.g., as used for notifications between web pages). In various implementations, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g., as may be recorded or implemented using the programming environment synchronization/notices manager 260, for example.) Applicable to such cases, U.S. Pat. No. 8,028,085, which is hereby incorporated herein by reference in its entirety, describes low latency methods which may be adapted to support such features.

In one implementation, determining and/or generating various workpiece features and measurement operations in the CAD file processing portion 205 and the inspection path/sequence manager 206 may include generating and/or sharing a unique identifier for each workpiece feature and inspection operation. When the results from those portions are used in other portions of the programming portion 202 (e.g., as outlined above), the various identifiers may also be used or cross-referenced in the other portions to establish relevant associations between corresponding workpiece features and/or inspection operations across the various processing and/or user interface portions. In various implementations, such techniques may be utilized for determining correspondences such as between the workpiece features and inspection operation representations in the editable plan representation 214 or 234 and the workpiece features in the 3D view, as part of the performance of various transparency operations as disclosed herein and/or various editing operations, etc.

The user interface of the programming portion 202 includes editing operations (which also include the underlying programming instructions and/or routines) usable to edit the workpiece feature inspection plan and/or inspection program. For example, following an activation of a feature-directed operation (e.g., a selection operation) for selecting text or graphical elements that represent workpiece features or inspection operations in the editable plan representations 214 or 234, the editing operations may include activation of relevant commands or other user interface operations that affect the selected elements. In various implementations, the editing operations portion 240 may provide or identify such operations. In one implementation, the inspection plan modification notices portion 249 may be responsive to operations included in the editing operations portion 240 to provide a notice to the programming environment synchronization/notices manager 260 that an inspection plan modification is taking place.

In response, the programming environment synchronization/notices manager 260 may then (e.g., automatically) manage the exchange of various event or programming operation notifications and related unique identifiers, such that the CAD file processing portion 205 and/or the inspection path/sequence manager 206 appropriately edit or modify the current inspection plan and inspection program in a synchronized manner when one of the editing operations is performed. Such plan and program modifications may be performed very quickly in various implementations, because the unique identifiers described above may be used to efficiently focus the modifications on only those features and/or measurement operations affected by the currently active one of the editing operations. After that, the programming environment synchronization/notices manager 260 may notify other portions of the programming portion 202 (e.g., as outlined above), so that they are immediately updated using information from the edited plan and/or program. The unique identifier(s) of the most recently edited elements may again be used to speed up such operations, in that the updating need only focus on those elements associated with the identifiers.

In various implementations, the programming environment synchronization/notices manager 260 may also manage inter-portion communications and exchanges besides those associated with the editing operations (e.g., using various techniques and identifiers similar to those outlined above.) In various implementations, it may facilitate the synchronization between the various user interface windows or portions of the programming portion 202. For example, selection of a particular feature or instruction in one window may automatically trigger a notification or instruction to other windows to display a corresponding feature or instruction in that other window, or depict a program operating state associated with the selected feature or instruction, or the like. In various implementations, such functions may be utilized with respect to the transparency operations as described herein, as well as with respect to other functions (e.g., editing functions), etc.

It will be appreciated that the implementation(s) outlined above for achieving real time synchronization between various portions of the programming portion 202 is exemplary only, and not limiting. For example, the function of the identifiers outlined above may be provided by suitable database or lookup table associations or the like, without the presence of an explicit "identifier." These and other alternatives will be apparent to one of ordinary skill in the art based on the teachings disclosed herein.

The execution time portion 270 may include an execution time indicator portion 272 and an execution time calculating portion 274. In order to provide feedback to a user performing editing operations, the execution time indicator portion 272 may provide a "real time" indication of an estimated inspection program execution time for operating the CMM to execute a workpiece inspection program corresponding to the current workpiece feature inspection plan as executed by a current CMM configuration. In various implementations, the programming portion 202 may be configured such that the execution time indicator portion 272 is automatically updated in response to a utilization of one of the operations included in the editing operations portion 240 to modify the current workpiece feature inspection plan, so as to automatically indicate the estimated effect of the modification on the inspection program execution time. In various implementations, the editing operations portion 240 may include or identify operations corresponding to inclusion of a workpiece feature 241A, exclusion of a workpiece feature 241B, a delete command 242, an undo command 243, sequence editing 244 and altering a CMM configuration 245, as described in more detail in the previously incorporated '958 publication. In various implementations, the editing operations portion 240 may further include or identify operations corresponding to adding or deleting individual sampling points (e.g., touch points for a stylus) on a workpiece feature, or changing the motion plan for traversing between individual sampling points, or the like.

Another operations portion 250 may include other operations relevant to the use and functioning of the programming portion 202 and/or general computing system 105. The 3D view portion 220 may display a 3D view including workpiece features on the workpiece and an indication of inspection operations to be performed on the workpiece features according to the current workpiece feature inspection plan. The simulation status and control portion 280 may include a simulation status portion 281 that is configured to characterize a state of progress through the current workpiece feature inspection plan corresponding to a currently displayed 3D view, and the execution time indicator portion 272 may be displayed in conjunction with the simulation status portion 281.

In various implementations, the simulation status portion 281 may include a current time indicator 282 that moves along a graphical total time range element 283 to characterize a state of progress through the current workpiece feature inspection plan corresponding to the currently displayed 3D view, and the execution time indicator portion 272 may be displayed in association with the graphical total time range element 283. In one implementation, the simulation status portion 281 further includes a current time display 284 which includes a numerical time representation that is automatically updated corresponding to the current time indicator 282 or the currently displayed 3D view, and that further characterizes the state of progress through the current workpiece feature inspection plan corresponding to the currently displayed 3D view. In one implementation, the simulation status and control portion 280 further includes a simulation animation control portion 290 which includes elements that are usable to control at least one of a start 291, pause 292, stop 293, reset 294, reverse 295, loop 296, increase in speed 297 or decrease in speed 298 of an animated display of simulated progress through the current workpiece feature inspection plan as displayed in the 3D view.

In various implementations, the transparency operations portion 237 may also be utilized to implement certain additional transparency operations with respect to the display in the 3D view (e.g., with respect to an animated display of simulated progress through the current workpiece feature inspection plan as displayed in the 3D view). For example, in various implementations the first set of feature-directed operations may further include inspection operations performed on workpiece features as part of the current workpiece feature inspection plan. In such a configuration, when an inspection operation is performed or selected, a workpiece feature that the inspection operation is directed to may be automatically identified as a current target feature by the transparency operations. In various implementations, the inspection operation that is performed or selected may be included in an inspection sequence, and may include measuring and/or touching a sampling point on the workpiece feature that the inspection operation is directed to, using a CMM measuring probe. In various implementations, when an inspection operation is automatically performed as part of an active program simulation, a workpiece feature that the inspection operation is performed on may be automatically identified as a current target feature by the transparency operations. In various implementations, when an inspection operation is performed as part of manually or semi-automatically stepping through a program simulation, a workpiece feature that the inspection operation is performed on may be automatically identified as a current target feature by the transparency operations. In any of these examples, once a current target feature is identified, as described above, the transparency operations may further include automatically rendering as at least partially transparent in the 3D view an occluding workpiece feature that would otherwise be occluding at least a portion of the current target feature in the 3D view.

In various implementations, the computing system 105 and/or other associated computer system(s) may include suitable unitary or distributed computing systems or devices, which may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on, that perform particular tasks or implement particular abstract data types. In distributed computing environments, the functionality of the program modules may be combined or distributed across multiple computing systems or devices and in various implementations may be accessed via service calls.

Figure 3:
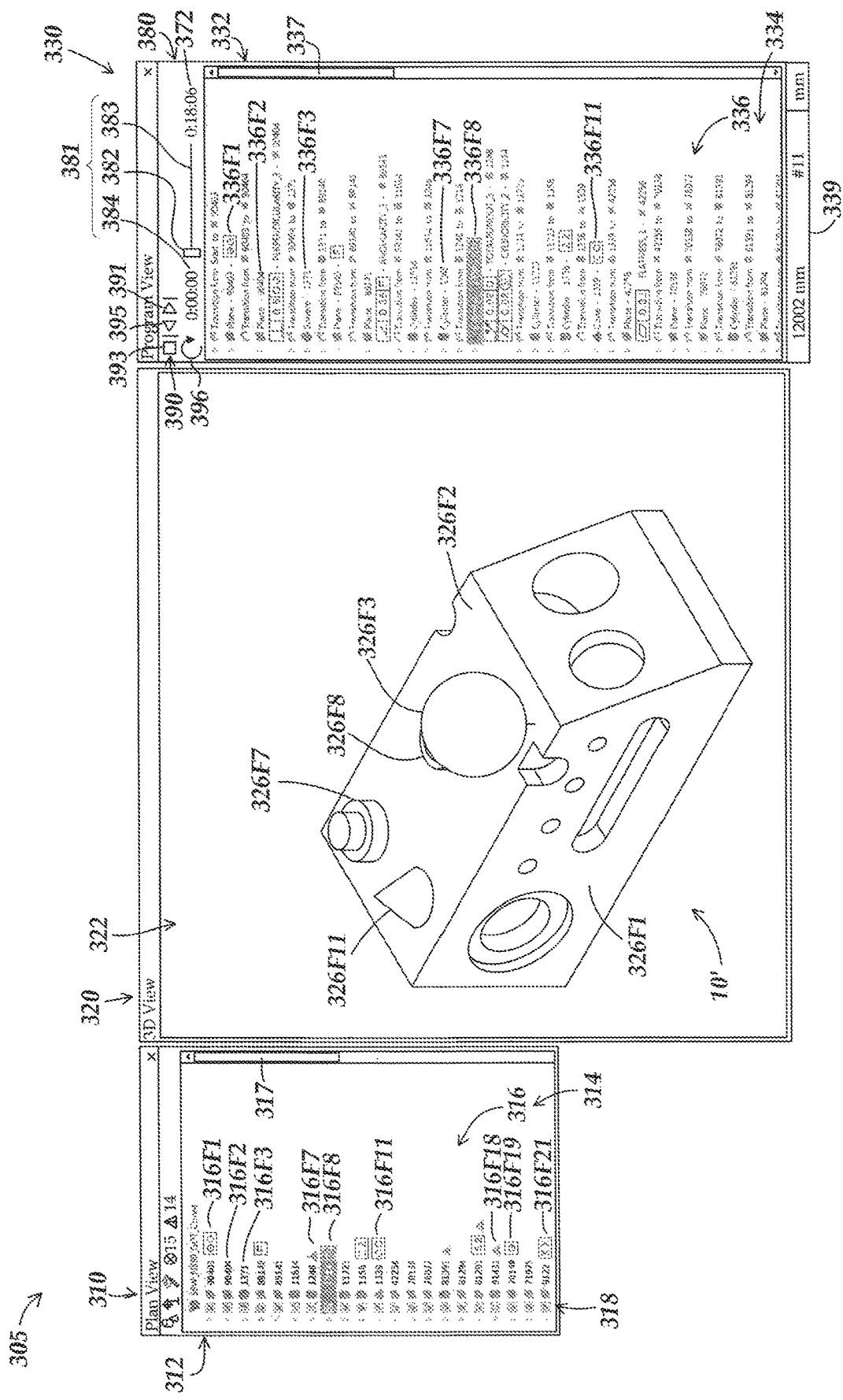
FIG. 3 is a diagram of a user interface including a plan view window, a 3D view window and a program view window.

FIG. 3 is a diagram of a user interface 305 (e.g., as may be shown on the display unit 5D of FIG. 1, the display portion 175 of FIG. 2A, etc.), It will be appreciated that certain numbered elements 3XX of the user interface 305 may correspond to and/or be provided by similarly numbered elements 2XX of FIGS. 2A and 2B, except as otherwise described below. In the implementation shown in FIG. 3, the user interface 305 includes a plan view window 310, a 3D view window 320 and a program view window 330. The plan view window 310 includes an editing user interface portion 312, the 3D view window 320 includes a workpiece inspection program simulation portion 322, and the program view window 330 includes an editing user interface portion 332 and a simulation status and control portion 380. In various implementations, the simulation status and control portion 380 may include a simulation status portion 381 and a simulation animation control portion 390, as will be described in more detail below with respect to FIG. 5.

As shown in FIG. 3, the editing user interface portions 312 and 332 each include editable plan representations 314 and 334, respectively, of a workpiece feature inspection plan for a workpiece 10 corresponding to a CAD file. The editable plan representation 314 is organized in terms of geometric features to be inspected on the workpiece. The editable plan representation 334 is organized as inspection program pseudo-code or actual code or graphical program operation representations or the like, in various implementations. When editing operations are performed for one of the editable plan representations 314 or 334, the other editable plan representation may be automatically updated in a manner consistent with those editing operations by operation of the various system elements illustrated and described with respect to FIGS. 2A and 2B. However, in an alternative implementation, only one of the editable plan representations 314 or 334 may be editable. In such a case, the other plan representation may be absent, or hidden, or may be displayed and automatically updated in a manner similar to that outlined above.

As described above with respect to FIGS. 2A and 2B, in various implementations, a computer aided design (CAD) file processing portion may input a workpiece CAD file corresponding to a workpiece 10 and may analyze the file to automatically determine inspectable workpiece features on the workpiece 10 corresponding to a plurality of geometric feature types (e.g., cylinder, plane, sphere, cone, etc.) In FIG. 3 the editable plan representations 314 and 334 include the editable set of workpiece features 316 and 336 to be inspected. As will be described in more detail below, an execution time indicator 372 is provided that is indicative of an estimated inspection program execution time for operating the CMM to execute a workpiece inspection program corresponding to the current workpiece feature inspection plan as executed by a current CMM configuration. Editing operations are usable to edit the workpiece feature inspection plan, and the system is configured such that the execution time indicator 372 is automatically updated in response to a utilization of one of the editing operations to modify the current workpiece feature inspection plan, so as to automatically indicate the estimated effect of the modification on the inspection program execution time.

The editable plan representation 314 that is illustrated in FIGS. 3-6 includes a number of workpiece features 316F1-316Fn on the workpiece 10' that may be inspected (e.g., where n represents a total number of workpiece features that may be inspected). The workpiece features 316F1-316Fn correspond to workpiece features 326F1-326Fn in the workpiece inspection program simulation portion 322, and to workpiece features 336F1-336Fn in the editable plan representation 334, respectively. In order to simplify the figures, only some of the workpiece features are labeled. In the example of FIG. 3, the workpiece features 316F1-316F21 are currently visible in the plan view window 310, wherein a user may utilize controls to increment or scroll down (e.g., utilizing a vertical scroll bar 317, etc.) to view additional workpiece features. Similarly, a vertical scroll bar 337 may be used to scroll up and down the program view window 330.

The 3D view window 320 displays a 3D view of the workpiece inspection program simulation portion 322 including workpiece features 326 on the workpiece 10'. In various implementations, the 3D view may also include an indication of inspection operations to be performed on the workpiece features 326 according to the current workpiece feature inspection plan (e.g., as will be described in more detail below with respect to FIG. 5). As shown in FIG. 3, some illustrative examples of workpiece features are labeled, such as planes 326F1 and 326F2, a sphere 326F3, cylinders 326F7 and 326F8, and a cone 326F11. In various implementations, these correspond to workpiece features 316F1, 316F2, 316F3, 316F7, 316F8 and 316F11 in the editable plan representation 314, and to workpiece features 336F1, 336F2, 336F3, 336F7, 336F8 and 336F11 in the editable plan representation 334, respectively. With respect to the workpiece feature 326F8 in the 3D view, in the editable plan representation 334 the corresponding workpiece feature 336F8 includes a description of "cylinder—1214" along with a displayed cylinder icon, and in the editable plan representation 314 the corresponding workpiece feature 316F8 includes a description of "1214" along with a displayed cylinder icon. In various implementations, such descriptions and icons may be automatically generated and displayed as corresponding to a numbered designation and geometric type (e.g., cylinder, plane, sphere, cone, etc.) for each of the workpiece features.

With respect to the editing operations that are usable to edit the workpiece feature inspection plan, in one implementation the editing user interface portion 312 may include workpiece feature exclusion/inclusion elements 318 (e.g., checkboxes next to each of the workpiece features 316) that operate to toggle between an exclusion state (e.g., with the associated box unchecked) and an inclusion state (e.g., with the associated box checked) for each associated workpiece feature 316. An exclusion state may correspond to an exclusion of the associated workpiece feature 316 from the set of workpiece features to be inspected, and an inclusion state may correspond to an inclusion of the associated workpiece feature 316 in the set of workpiece features to be inspected. In the example of FIG. 3, all of the workpiece features 316 have been selected for inclusion. In various implementations, the editing operations may include a utilization of the workpiece feature exclusion/inclusion elements 318 to either exclude or include workpiece features 316 with respect to the set of workpiece features to be inspected, and the execution time indicator 372 may automatically be updated in response to a utilization of a workpiece feature exclusion/inclusion element 318, as described in more detail in the previously incorporated '958 publication.

In various implementations, as part of editing or other processes, enabling a user to clearly view a selected workpiece feature and/or related editing processes and/or results in a 3D simulation or animation view may provide various advantages. As one example, with respect to a determination and/or acceptance of an editing operation, the total execution time of an inspection plan may depend in part on the number of workpiece features to be inspected and the inspection operations to be performed thereon. The resulting total execution time relates directly to the inspection throughput of a CMM, which determines its cost of ownership and/or ability to support a desired rate of production. In order to reduce the total execution time (e.g., to increase efficiency, etc.), a user may review workpiece features and inspection operations to determine which ones may not need to be included in a current inspection plan. As part of such review (and for other reasons), it may be desirable for a user to be able to view each workpiece feature and/or any corresponding inspection operations in the 3D view. However, such viewing may be inhibited if a target workpiece feature that is currently under consideration is occluded in the 3D view by another workpiece feature (e.g., workpiece feature 326F3 is occluding workpiece feature 326F8 in the 3D view of FIG. 3). In accordance with various principles disclosed herein, in such a circumstance, transparency operations may be performed to render the occluding workpiece feature(s) at least partially transparent, as will be described in more detail below with respect to FIG. 4.

Figure 4:
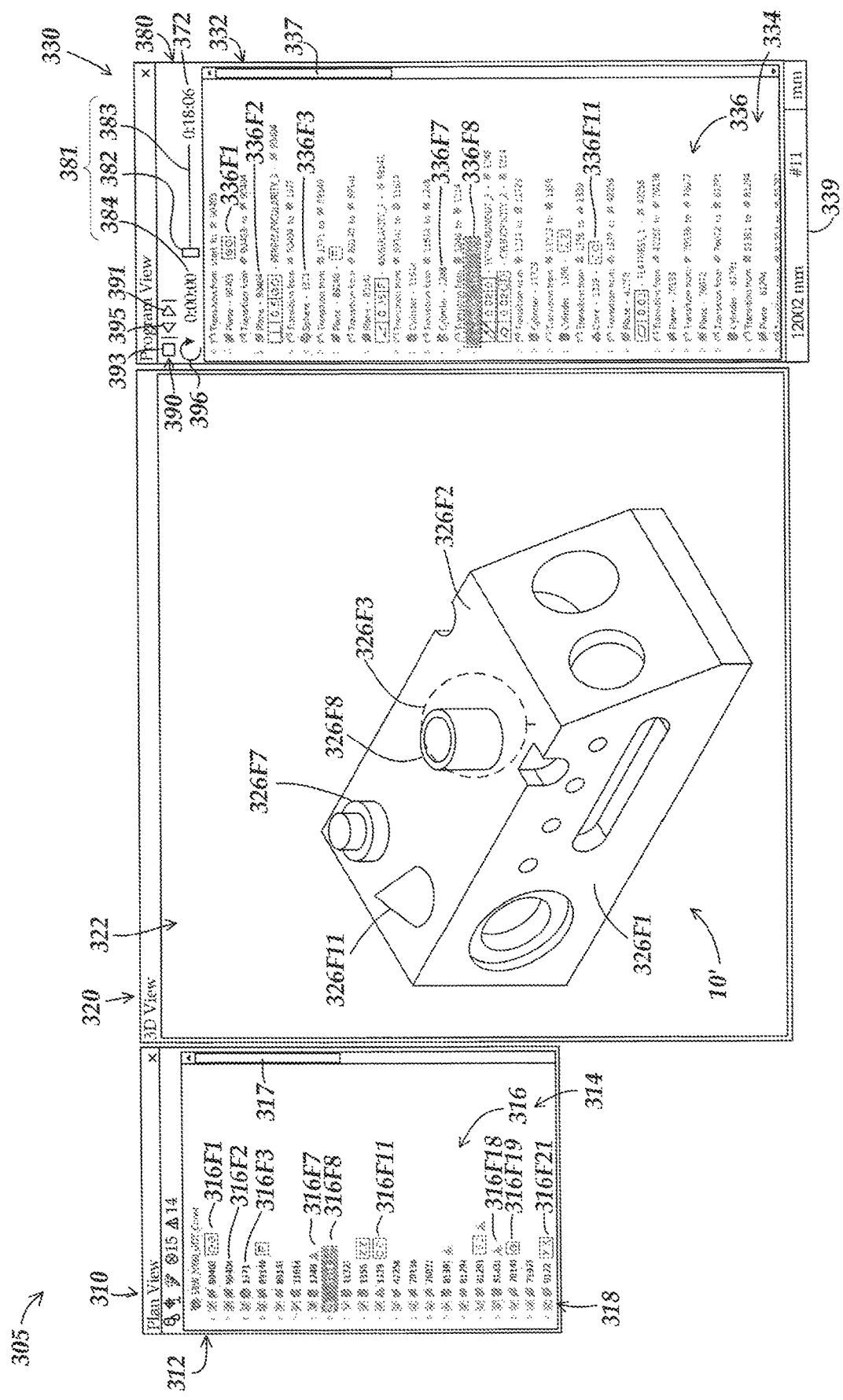
FIG. 4 is a diagram of a user interface illustrating a target feature and an occluding workpiece feature that has been rendered as at least partially transparent in a 3D window by performance of transparency operations.

FIG. 4 is a diagram of the user interface 305 illustrating a target feature 326F8 and an occluding workpiece feature 326F3 that has been rendered as at least partially transparent in the 3D view window 320 by performance of transparency operations. In various implementations, such transparency operations may be automatically performed by the system in response to a feature-directed operation included in a first set of feature-directed operations. In various implementations, the first set of feature-directed operations may include a selection operation for a workpiece feature or an inspection operation representation in the editable plan representation. In various implementations, the first set of feature-directed operations may also or alternatively include at least one of a hover or pass-over operation for a workpiece feature or an inspection operation representation in the editable plan representation. In various implementations, the first set of feature-directed operations that the transparency operations are performed in response to may include only a single feature-directed operation (e.g., a selection operation), or may include multiple feature-directed operations (e.g., a selection operation and a hover or pass-over operation, etc.).

In various implementations, a selection operation may include a positioning of a selector element (e.g., a mouse cursor) proximate to a workpiece feature or inspection operation representation in an editable plan representation, and a performance of a selection action for selecting a workpiece feature or inspection operation representation.

For example, with respect to the editable plan representation 314 or 334 of FIG. 3, a user may utilize a mouse or other input device to position a selector element (e.g., a movable pointer, cursor, highlighted area, finger on a touch screen, etc.) over a workpiece feature or inspection operation, and may select the workpiece feature or inspection operation representation through a performance of a selection action (e.g., pressing a key, button, mouse, pushing a finger on a touch screen, etc.). As another example, in a holographic three-dimensional view, the selector element may include an element such as a pointer or the user's finger, and the selector element may be used to perform a selection action in the editable plan representation 314 or 334 (e.g., the user making a particular type of motion with the selector element for making a selection). In one specific illustrative example, in the state illustrated in FIG. 3, a user may have positioned a selector element over the workpiece feature 336F8 in the editable plan representation 334 (e.g., as indicated by a highlighting of the workpiece feature 336F8 or other indicator in various implementations). In the state illustrated in FIG. 4, the user may have performed a selection action for selecting the workpiece feature 336F8 (e.g., as may be indicated by a dotted-line box around the workpiece feature 336F8 or other indicator in various implementations), on the basis of which certain transparency operations may have been performed in the 3D view (e.g., rendering the workpiece feature 326F3 as at least partially transparent), as will be described in more detail below.

As another example, a hover operation may similarly include a positioning of a selection indicator relative to a workpiece feature or inspection operation representation in the editable plan representation 314 or 334 and a hovering of the selection indicator for at least a specified period of time relative to the workpiece feature or inspection operation representation. As part of the hover operation, in various implementations, once the specified period of time has been reached with the selection indicator still positioned relative to (e.g., positioned on top of, etc.) the workpiece feature or inspection operation representation, such a sequence may operate as a type of selection action which thus selects the workpiece feature or inspection operation representation. In one specific illustrative example, in the state illustrated in FIG. 3, a user may have positioned a selector element over the workpiece feature 336F8 in the editable plan representation 334 (e.g., as indicated by a highlighting of the workpiece feature 336F8 or other indicator in various implementations). In the state illustrated in FIG. 4, the user may have maintained the position of the selector element for the specified period of time in accordance with the hover operation for selecting the workpiece feature 336F8 (e.g., as may be indicated by a dotted-line box around the workpiece feature 336F8 or other indicator in various implementations), on the basis of which certain transparency operations have been performed in the 3D view (i.e., rendering the workpiece feature 326F3 as at least partially transparent) as will be described in more detail below.

As yet another example, a pass-over operation may include a moving of a selection indicator to pass over a workpiece feature or inspection operation representation in the editable plan representation 214 or 234. In one specific illustrative example, in the state illustrated in FIG. 3, a user may not yet have positioned a selector element over the workpiece feature 336F8 in the editable plan representation 334 (i.e., in which case the workpiece feature 336F8 may not yet be highlighted or otherwise indicated). In the state illustrated in FIG. 4, the user may be in the process of having the selection indicator pass over the workpiece feature 336F8 (e.g., as may be indicated by highlighting and/or a dotted-line box around the workpiece feature 336F8 or other indicator in various implementations), on the basis of which certain transparency operations may have been performed in the 3D view (e.g., rendering the workpiece feature 326F3 as at least partially transparent) as will be described in more detail below. In various implementations, a hover operation and/or a pass-over operation may also be included as a type of selection operation (e.g., wherein a first type of selection operation may require a performance of a selection action, and a second type of selection operation may not require a performance of a selection action in addition to the positioning of the selection indicator, such as a hover operation).

As noted above, in response to a performance of a current feature-directed operation (e.g., a selection operation, a hover operation, a pass-over operation, etc.) that is included in a first set of feature-directed operations, a set of transparency operations may be performed. As an initial step, the transparency operations may include automatically identifying as a current target feature a workpiece feature in the 3D view that corresponds to a workpiece feature or inspection operation representation that is indicated by the current feature-directed operation included in the first set of feature-directed operations. In the example of FIG. 4, the workpiece feature that is indicated by the current feature-directed operation is the workpiece feature 336F8 in the editable plan representation 334, and the current target feature that is correspondingly automatically identified is the workpiece feature 326F8 in the 3D view window 320. Various processes by which the workpiece feature 336F8 may be corresponded with the workpiece feature 326F8 have been previously described herein with respect to FIGS. 2A and 2B.

In various implementations, the transparency operations may further include determining if there are one or more workpiece features that are occluding the target feature in the 3D view. In various implementations, such a determination may require consideration of various factors. As one possible factor, such a determination may depend at least in part on a current orientation of the 3D view. For example, depending on the relative positions of the workpiece features on the workpiece 10', a given workpiece feature may or may not be occluding another workpiece feature depending on the orientation of the 3D view. In various implementations, the system may be configured to utilize the known positions, sizes, etc. of the workpiece features on the workpiece 10', in combination with the known viewing angle for a current orientation of the 3D view, etc., in order to determine which workpiece features may be occluding other workpiece features and/or inspection operations, etc. In the example of FIG. 4, it has been determined that the workpiece feature 326F3 is occluding the workpiece feature 326F8 in the current orientation of the 3D view.

In the example of FIG. 4, it has further been determined that certain other workpiece features are not occluding the target feature 326F8. For example, the workpiece features 326F2, 326F7 and 326F11 have each been determined to not be occluding the workpiece feature 326F8 in the current orientation of the 3D view. In accordance with this determination, the workpiece features 326F2, 326F7 and 326F11 have not automatically been rendered as transparent by the automatically performed transparency operations.

In accordance with the determination that the workpiece feature 326F3 is occluding at least a portion of the workpiece feature 326F8 in the current orientation of the 3D view, as part of the transparency operations the workpiece feature 326F3 has been automatically rendered as at least partially transparent. In various implementations, the amount of transparency of the workpiece feature 326F3 may be set for a user to be able to clearly view the otherwise occluded workpiece feature 326F8, while still being able to view some context and position of the workpiece feature 326F3. For example, during review of a workpiece feature inspection plan, it may be desirable for a user to be able to view and understand the relative positioning and context between the workpiece features 326F3 and 326F8 and/or associated inspection operations, even after the workpiece feature 326F3 has been rendered as at least partially transparent. In various implementations, the level and type of transparency (e.g., including different levels of transparency and/or different types of patterns or representations for outlines and fills of workpiece features that are being rendered as at least partially transparent, etc.) may be set by the system and/or may otherwise be adjustable (e.g., including a user interface feature which allows a user to select and/or adjust the transparency levels and features, etc.)

In various implementations, as part of the transparency operations or other operations, the target feature 326F8 may also be highlighted or otherwise marked in the 3D view. For example, as noted above, the workpiece feature that is indicated by the current feature-directed operation is the workpiece feature 336F8 in the editable plan representation 334, and the current target feature that is correspondingly automatically identified is the workpiece feature 326F8 in the 3D view window 320. In various implementations, after the workpiece feature 326F8 is automatically identified as the target feature, the 3D view window 320 may be updated to indicate that the workpiece feature 326F8 is the target feature (e.g., the workpiece feature 326F8 may be highlighted or otherwise marked or indicated and/or may become the active target of subsequent commands or operations, including inspection operations and/or the automatic rendering of any occluding workpiece features as at least partially transparent, etc.).

It will be appreciated that in various implementations the aspect of the workpiece feature 336F8 being selected or otherwise indicated in the editable plan representation 334 as opposed to the workpiece feature 326F8 being selected in the 3D view window 320 may provide various advantages. For example, as illustrated in certain of the incorporated references, in certain prior systems a user may be required to make selections or perform actions in a 3D view (e.g., moving a user interface element or clicking on a feature in the 3D view, etc.) with respect to determining what transparency operations may be performed in the 3D view. In implementations such as those disclosed herein where a target feature that the user wishes to view is being determined, a selection of such a target feature in a 3D view may be difficult to perform in accordance with the fact that the target feature is at least partially occluded in the 3D view. More specifically, because the target feature is at least partially occluded in the 3D view, it may be difficult for a user to see, identify, and/or otherwise find the portion of the target feature that is visible in the 3D view (e.g., the portion of the target feature 326F8 that is visible in the 3D view window 320 of FIG. 3). In some instances, the occluding workpiece feature may be occluding the entire current target feature in the 3D view, such that no portion of the current target feature is visible or selectable in the 3D view. In accordance with various principles disclosed herein, by enabling a performance of a feature-directed operation (e.g., a selection operation) for selecting or otherwise indicating a workpiece feature or inspection operation representation in the editable plan representation 314 or 334, a target feature may be identified to be viewed in the 3D view window 320 even when the target feature is partially or entirely occluded in the 3D view window 320 before the transparency operations are automatically performed.

In various implementations, the transparency operations may not include rotating or otherwise adjusting the orientation of the 3D view after the current target feature is identified. More specifically, in an alternative implementation, a 3D view may be rotated or otherwise adjusted to improve viewing of a target feature that is otherwise occluded by another workpiece feature in a current orientation of a 3D view. For example, in the orientation of the 3D view illustrated in FIG. 3, the workpiece feature 326F3 is occluding the workpiece feature 326F8, for which an alternative implementation may include rotating or otherwise adjusting the 3D view to where the workpiece feature 326F3 is no longer occluding the workpiece feature 326F8 (e.g., rotating the 3D view 180 degrees to where the workpiece feature 326F3 is behind rather than in front of the workpiece feature 326F8). In contrast to an implementation in which such orientation adjustments are performed, in accordance with principles disclosed herein, the orientation of the 3D view may not be adjusted and an occluding workpiece feature in the current orientation of the 3D view may be automatically rendered as at least partially transparent. In certain alternative implementations, hybrid techniques may be utilized (e.g., as part of the transparency operations and/or as part of other operations) in which the orientation of the 3D view may be adjusted and transparency operations may be performed. More specifically, in various implementations, when an orientation of a 3D view is adjusted or considered for adjustment, at least some of the above described transparency operations may be performed to determine and/or render as at least partially transparent workpiece features that may otherwise be occluding a target feature in the adjusted orientation of the 3D view.

In various implementations, when the current feature-directed operation is terminated, the transparency operations associated with the current target feature in the 3D view may be automatically terminated. For example, in the implementation of FIG. 4, if the current feature-directed operation is a selection operation, the user may terminate the selection operation by performing an action for unselecting the workpiece feature 336F8 in the editable plan representation 334. In various implementations, such an action for unselecting a workpiece feature may include clicking on or otherwise selecting the workpiece feature an additional time, or clicking on or otherwise selecting a different workpiece feature in the editable plan representation 334, etc. If the feature-directed operation is a hover operation or a pass-over operation, the action for unselecting the workpiece feature 336F8 may include a positioning of the selection indicator in the editable plan representation 334 to no longer be over the workpiece feature 336F8. Once the workpiece feature 336F8 has been unselected in the editable plan representation 334 so as to terminate the current feature-directed operation, the transparency operations associated with the current target feature 326F8 in the 3D view may also automatically be terminated. In the example of FIG. 4, this may correspond to the workpiece feature 326F8 in the 3D view no longer being designated as a current target feature, and the workpiece feature 326F3 in the 3D view no longer being rendered as at least partially transparent (e.g., reverting to the state illustrated in the 3D view of FIG. 3).

Figure 5:
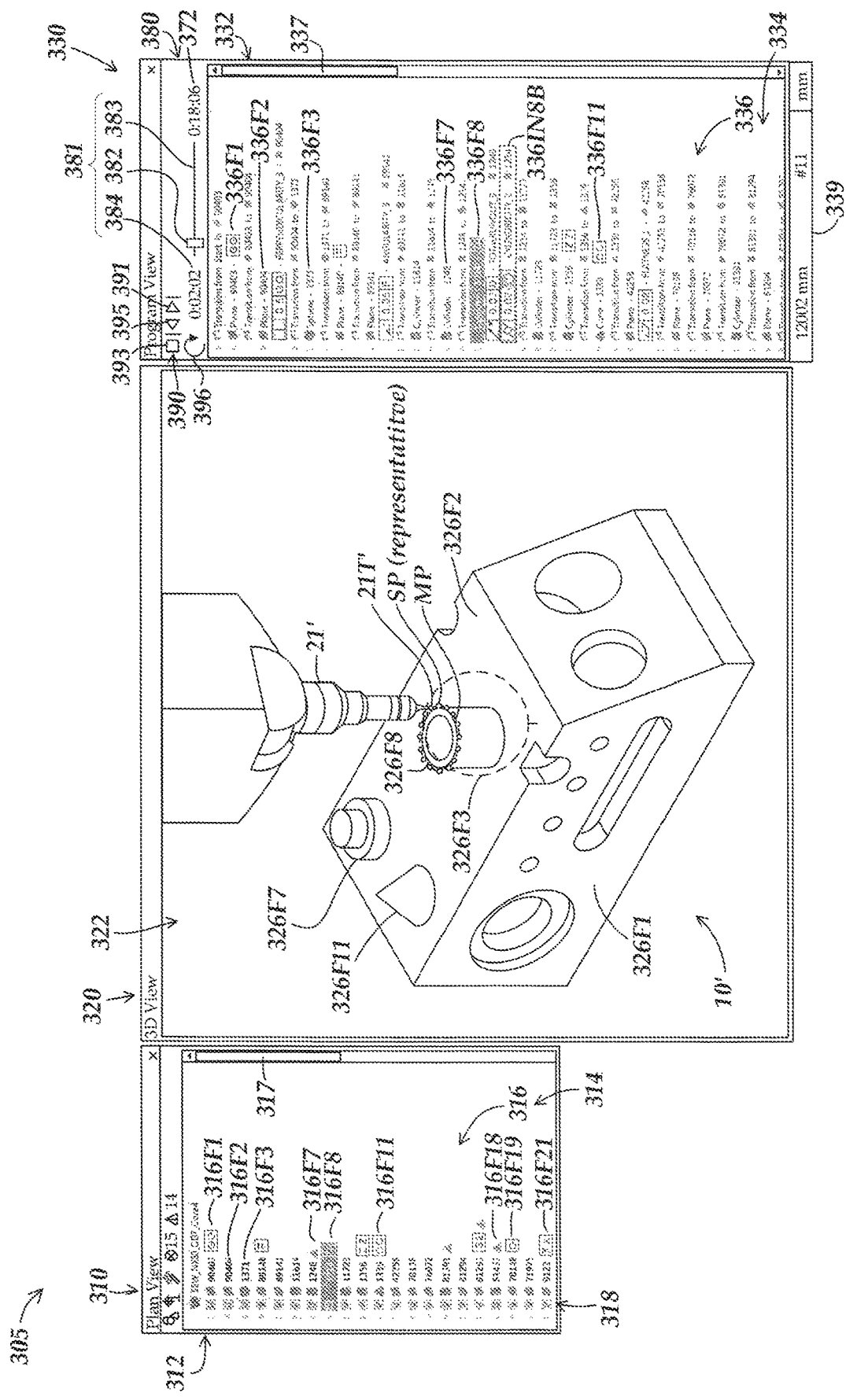
FIG. 5 is a diagram of a user interface illustrating performance of inspection operations on a target feature after transparency operations have been performed.

FIG. 5 is a diagram of the user interface 305 illustrating performance of certain inspection operations on a target feature 326F8. In the example of FIG. 5, the 3D view window 320 shows a touch probe 21' having a stylus tip 21T', which is positioned relative to a workpiece 10'. In the state illustrated, the touch probe stylus tip 21T' is contacting the workpiece feature 326F8. A measurement path MP indicates a motion path representation for the stylus tip 21T' and corresponding sampling points SP, corresponding to a portion of the current inspection plan represented in the various windows. Each of the sampling points SP indicates a point where the stylus tip 21T' contacts the workpiece feature 326F8, for obtaining measurement coordinates in accordance with the corresponding portion of the current inspection plan, as will be understood by one skilled in the art.

In various implementations, the measurement path MP and/or sampling points SP illustrated in FIG. 5 may correspond to one or more inspection operations. For example, the inspection operation representation 336IN8B in the editable plan representation 334 may correspond at least in part to the measurement path MP and sampling points SP illustrated in the 3D view window 320. In one implementation, such an inspection operation may be utilized for determining the cylindricity of the workpiece feature 326F8 (e.g., in part by determining how closely the upper circumference of the workpiece feature 326F8 approximates a circle, etc.) In various implementations, certain inspection operation representations may additionally or alternatively include information about specific sampling points, movements, angles, etc. for the performance of the inspections of the designated workpiece features. In the example of FIG. 5, it will be appreciated that in various implementations one or more inspection operations may include additional measurement paths and sampling points for measuring the workpiece feature 326F8 and other workpiece features (e.g., including additional tracks of measurement paths in middle, bottom, top, side, exterior, interior, etc. portions of workpiece features, such as are described in more detail in the previously incorporated '083 patent).

As noted above, in response to a performance of a current feature-directed operation that is included in a first set of feature-directed operations, a set of transparency operations may be performed including initially identifying as a current target feature a workpiece feature in the 3D view that corresponds to a workpiece feature or inspection operation representation that is indicated by the current feature-directed operation. In FIG. 5, in one example implementation an inspection operation representation that is indicated by the current feature-directed operation may be the inspection operation representation 336IN8B. For example, a user may have performed a selection operation for selecting the inspection operation representation 336IN8B. In various implementations, since the inspection operation representation 336IN8B corresponds to an inspection operation performed on the workpiece feature 336F8, the corresponding workpiece feature 326F8 in the 3D view may be identified as the current target feature, for which the occluding workpiece feature 326F3 may be automatically rendered as at least partially transparent. It will be appreciated that such transparency operations not only improve the visibility of the workpiece feature 326F8 in the 3D view, but also improve the visibility of any inspection operations that are illustrated as being performed on the workpiece feature 326F8 (e.g., such as the measurement path MP and corresponding sampling points SP, etc.).

In various implementations, in addition to a selection of an inspection operation representation, the first set of feature-directed operations may further include a performance of an inspection operation on a workpiece feature. In such a configuration, when an inspection operation is performed, a workpiece feature that the inspection operation is directed to may be automatically identified as a current target feature by the transparency operations. In various implementations, the inspection operation that is performed may be included in an inspection sequence, and may include measuring and/or touching a sampling point on the workpiece feature that the inspection operation is directed to (e.g., using a CMM measuring probe). In various implementations, when an inspection operation is automatically performed as part of an active program simulation, a workpiece feature that the inspection operation is performed on may be automatically identified as a current target feature by the transparency operations. In various implementations, when an inspection operation is performed as part of manually or semi-automatically stepping through a program simulation, a workpiece feature that the inspection operation is performed on may be automatically identified as a current target feature by the transparency operations. In any of these examples, once a current target feature is identified (e.g., the workpiece feature 326F8), as described above the transparency operations may further include automatically rendering as at least partially transparent in the 3D view an occluding workpiece feature (e.g., the workpiece feature 326F3) that would otherwise be occluding at least a portion of the current target feature in the 3D view.

With respect to illustrating and otherwise facilitating a user's understanding of where a workpiece feature and/or inspection operation (e.g., as selected by the user or otherwise activated, etc.) fits into an overall current workpiece feature inspection plan, as noted above, the simulation status and control portion 380 may include a simulation status portion 381 and a simulation animation control portion 390. Using synchronization techniques, the simulation status portion 381 may be configured to characterize a state of progress through the current workpiece feature inspection plan corresponding to a currently displayed 3D view of the workpiece inspection program simulation portion 322 and to the corresponding states of progress through the editable plan representations 314 and 334. In various implementations, the simulation status portion 381 may include a current time indicator 382 that moves along a graphical total time range element 383 to characterize a state of progress through the current workpiece feature inspection plan corresponding to the currently displayed 3D view and to the corresponding states of progress through the editable plan representations 314 and 334, and the execution time indicator 372 may be displayed in association with the graphical total time range element 383. In one implementation, as illustrated in the example of FIG. 5, the execution time indicator 372 may be displayed in the vicinity of the right-hand end of the graphical total time range element 383.

In various implementations, the simulation status portion 381 may further include a current time display 384 displayed in the vicinity of at least one of the current time indicator 382 or the graphical total time range element 383, and the current time display 384 may include a numerical time representation that is automatically updated corresponding to the current time indicator 382 or the currently displayed 3D view, and that further characterizes the state of progress through the current workpiece feature inspection plan corresponding to the currently displayed 3D view and to the corresponding states of progress through the editable plan representations 314 and 334. In the example of FIG. 5, the current time display 384 indicates a time of "0:02:02" out of a total time indicated by the execution time indicator 372 of "0:18:06", and the current time indicator 382 is shown at a proportional position along the graphical total time range element 383. This position of the current time indicator 382 and the time of the current time display 384 correspond to the current state of progress through the current workpiece feature inspection plan, which relative to the state of progress through the editable plan representation 314 indicates that the workpiece feature 316F8 is being inspected (e.g., after the planned inspections of workpiece features 316F1-316F7 in the inspection plan). Correspondingly, relative to the state of progress through the editable plan representation 334, this indicates that the workpiece feature 336F8 is being inspected (e.g., after the planned corresponding inspections of the workpiece features 336F1-336F7). In one implementation, the simulation animation control portion 390 may include elements that are usable to control an animated display of simulated progress through the current workpiece feature inspection plan as displayed in the 3D view. For example, a start element 391, stop element 393, reverse element 395 and loop element 396 are illustrated in the simulation animation control portion 390, although it will be appreciated that in other implementations other elements (e.g., corresponding to pause, reset, increase speed, decrease speed, etc.) may also be included.

In various implementations, the simulation status portion 381 may be adjustable by a user. For example, the position of the current time indicator 382 along the graphical total time range element 383 may be directly adjustable by a user and/or may be indirectly adjusted (e.g., through operation of control elements such as elements 391, 393, 395, 396, etc.), and when the position of the current time indicator 382 is adjusted the currently displayed 3D view may be altered to correspond to the state of progress through the current workpiece feature inspection plan that is indicated by the position of the current time indicator 382. In an instance where the current time indicator 382 is actively being slid by a user along the graphical total time range element 383, a progression through the current workpiece feature inspection plan may be displayed in the 3D view window 320 at a speed that corresponds to the speed at which current time indicator 382 is being slid.

In one implementation, the first set of feature-directed operations may include a feature-directed operation comprising a selection operation that comprises a selection or adjustment of the position of the current time indicator (e.g., by the user). In such an implementation, the workpiece feature or inspection operation representation that is indicated by the current feature-directed operation is the workpiece feature or inspection operation representation that corresponds to the state of progress through the editable plan representation 314 or 334. In the example of FIG. 5, with respect to the editable plan representation 314, this would correspond to the workpiece feature 316F8 or a corresponding inspection operation representation that is being performed or inspected at the indicated time as part of the inspection plan. With respect to the editable plan representation 334, this would correspond to the workpiece feature 336F8 or a corresponding inspection operation representation that is being performed or inspected at the indicated time as part of the inspection plan.

As noted above, in FIG. 5 the measurement path MP indicates a motion path representation for the stylus tip 21T and corresponding sampling points SP, corresponding to a portion of the current inspection plan represented in the various windows. As described in more detail in the previously incorporated '083 patent, in various implementations at least a portion of a measurement path MP for a coordinate measuring machine (e.g. for a touch probe, or other surface location sensor), including a plurality of sampling points, may be generated using a generic sampling pattern which corresponds to the type of surface feature that is being measured. For example, the measurement path MP illustrated in FIG. 5 may initially be generated utilizing a generic sampling pattern for a circle or cylinder, similar to the cylindrical workpiece feature 326F8.

Figure 6:
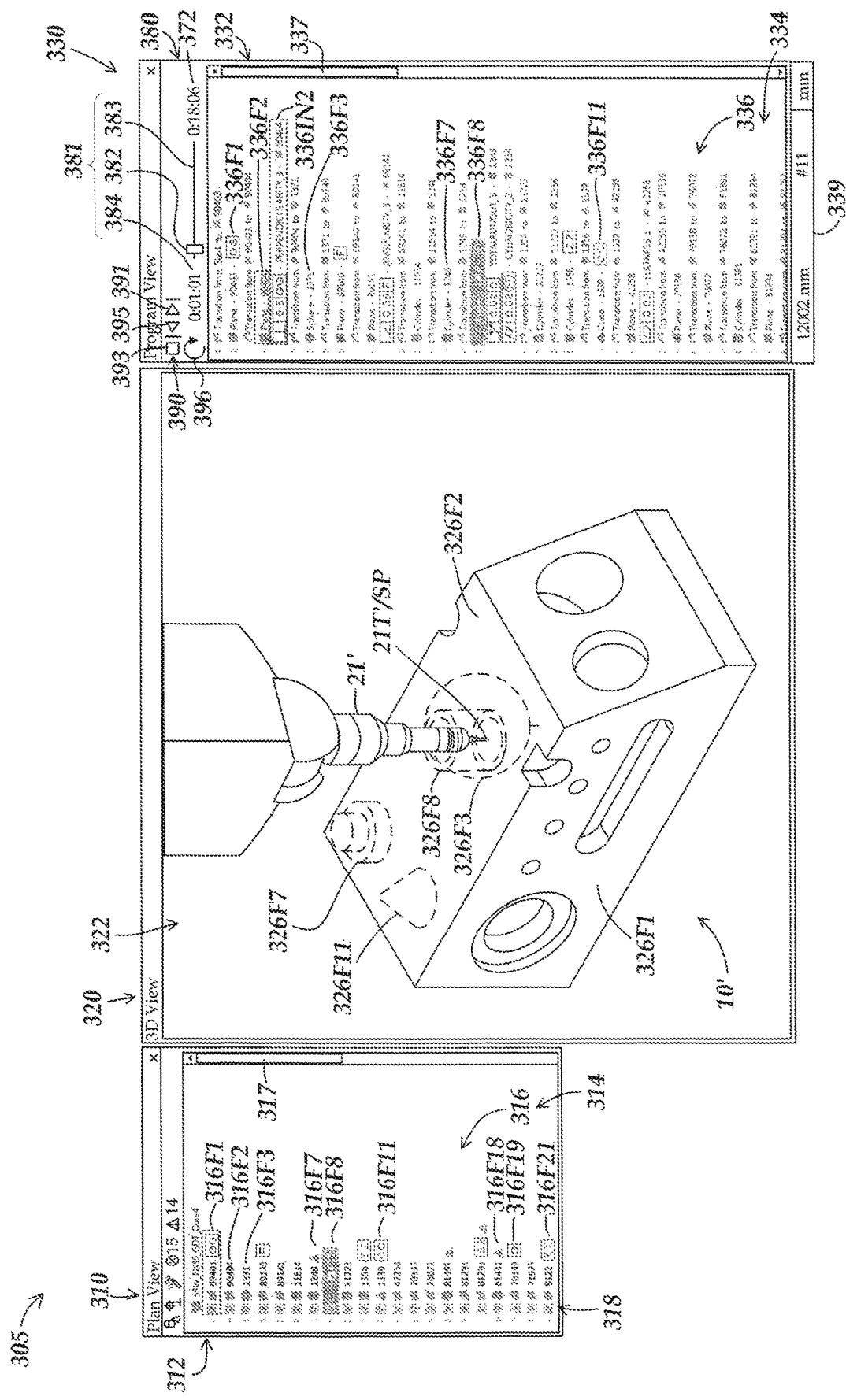
FIG. 6 is a diagram of a user interface illustrating a target feature and occluding workpiece features that have been rendered as at least partially transparent in a 3D window by performance of transparency operations.

FIG. 6 is a diagram of a user interface illustrating a target feature 326F2 or 326F8 and occluding workpiece features that have been rendered as at least partially transparent in the 3D view window 320 by performance of transparency operations. In one example implementation, the workpiece feature 326F2 may be identified as the current target feature (e.g., in accordance with a user's selection or other indication of the corresponding workpiece feature 336F2 in the editable plan representation 334). In accordance with the identification of the workpiece feature 326F2 as the target feature, the workpiece features 326F3, 326F7, 326F8 and 326F11 may each be rendered as at least partially transparent by the transparency operations. More specifically, since each of the workpiece features 326F3, 326F7, 326F8 and 326F11 would otherwise be occluding at least a portion of the current target feature 326F2, each of those workpiece features may be rendered as at least partially transparent. Corresponding to a selection or other indication of the workpiece feature 336F2, the current time display 384 is shown to indicate a time of "0:01:01" out of a total time indicated by the execution time indicator 372 of "0:18:06", and the current time indicator 382 is shown to be at a proportional position across the graphical total time range element 383. This indicates that the inspection of the workpiece feature 326F2 occurs approximately at the time "0:01:01" (e.g., after the planned inspection of the workpiece feature 336F1 in the inspection plan).

In the illustration of FIG. 6, the touch probe stylus tip 21T' may be positioned to be contacting a sampling point SP on the workpiece feature 326F2 (i.e., wherein the workpiece feature 326F8 is open at the bottom and is resting on the workpiece feature 326F2). As part of a measurement path (not shown) other sampling points on the workpiece feature 326F2 may also be determined (e.g., including some potentially behind or otherwise occluded by the workpiece features 326F7 and 326F11). In general, it will be appreciated that the rendering of the workpiece features 326F3, 326F7, 326F8 and 326F11 as at least partially transparent by the transparency operations improves the visibility of the workpiece feature 326F2 and any corresponding inspection operations related to the workpiece feature 326F2 that may otherwise be occluded by the workpiece features 326F3, 326F7, 326F8 and 326F11.

In an alternative example implementation, the workpiece feature 326F8 may be identified as the current target feature (e.g., in accordance with a user's selection or other indication of the workpiece feature 336F8 in the editable plan representation 334), for which only the workpiece features 326F3 and 326F8 may each be rendered as at least partially transparent by the transparency operations. It will be appreciated that in this particular example implementation, the workpiece features 326F7 and 326F11 may not be rendered as at least partially transparent by the transparency operations, as they may be determined to not be occluding the workpiece feature 326F8 in the 3D view. In such an example implementation, the touch probe stylus tip 21T' may be determined to be contacting a sampling point SP on the workpiece feature 326F8 (e.g., wherein the workpiece feature 326F8 has a capped or otherwise solid bottom end that the sampling point SP is contacting). In such an example implementation, the transparency operations may further include determining that at least the sides of the current target feature 326F8 may be a foreground portion of the current target feature 326F8 which would otherwise be occluding at least a background portion (e.g., the bottom) of the current target feature 326F8. In regard to such a determination, the transparency operations may further include automatically rendering as at least partially transparent in the 3D view the sides of the target feature 326F8 (i.e., as a foreground portion) that would otherwise be occluding at least the bottom of the target feature 326F8 (i.e., as a background portion) in the 3D view. In other implementations, the transparency operations may include automatically rendering the entire target feature 326F8 as at least partially transparent (e.g., to improve the visibility of inspection operations relative to various portions of the target feature 326F8). In FIG. 6, as part of a measurement path (not shown), other sampling points on the workpiece feature 326F8 may also be determined (e.g., such as those illustrated in FIG. 5, etc.). It will be appreciated that in such an example implementation, in addition to the rendering of the workpiece feature 326F3 as at least partially transparent, the rendering of the workpiece feature 326F8 (or portions thereof) as at least partially transparent may improve the visibility of certain otherwise occluded portions of the workpiece feature 326F8 and certain otherwise occluded corresponding inspection operations related to the workpiece feature 326F8 (e.g., with respect to various sampling points on the workpiece feature 326F8, etc.).

Figure 7:
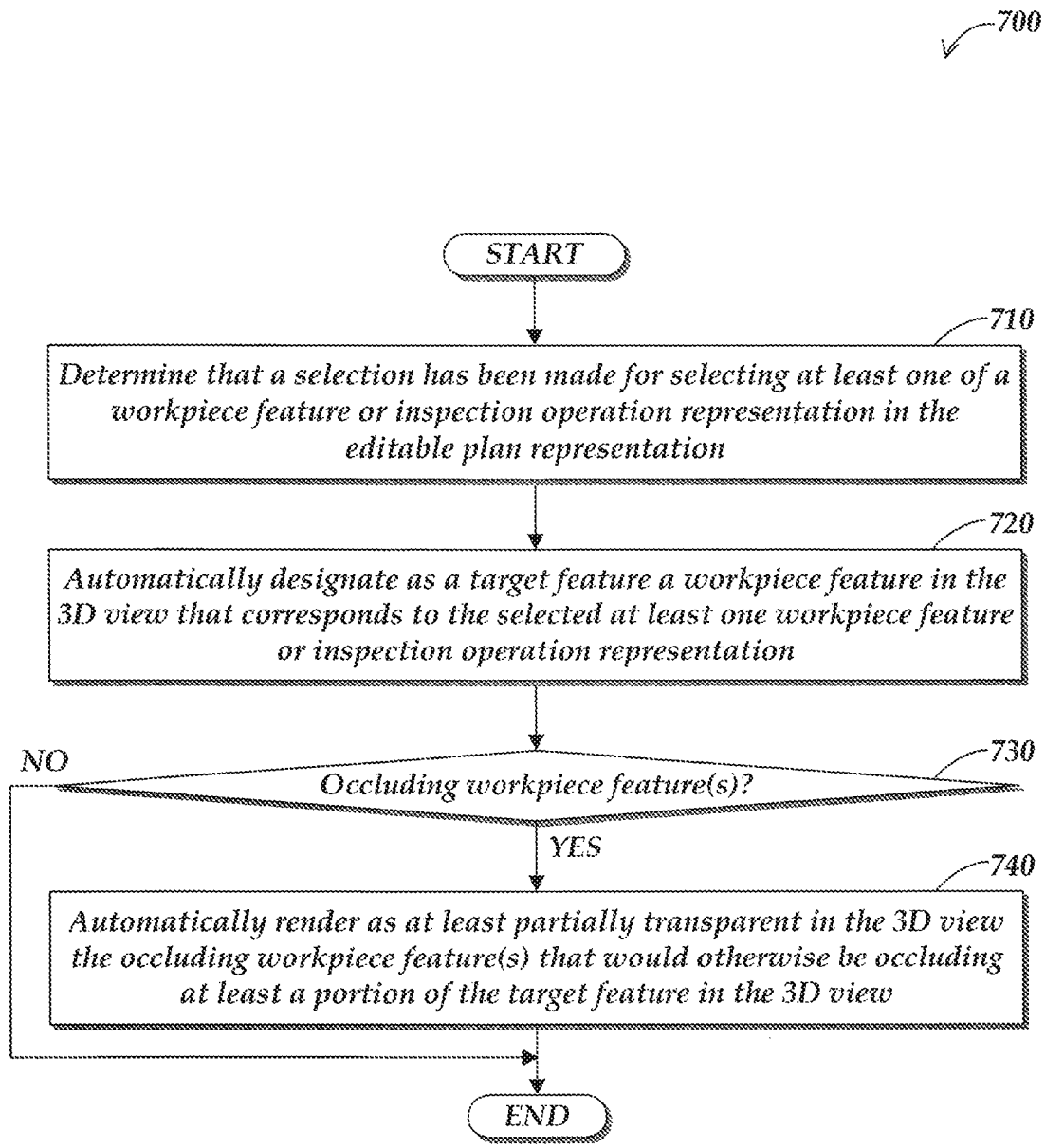
FIG. 7 is a flow diagram illustrating one exemplary implementation of a routine for operating a system for programming workpiece feature inspection operations for a coordinate measuring machine.

FIG. 7 is a flow diagram illustrating one exemplary implementation of a routine 700 for operating a system for programming workpiece feature inspection operations for a coordinate measuring machine. At a block 710, a determination is made that a selection has been made for selecting at least one of a workpiece feature or inspection operation representation in an editable plan representation. At a block 720, a workpiece feature in a 3D view is automatically designated as a target feature that corresponds to the selected workpiece feature or inspection operation representation. At a decision block 730, a determination is made as to whether there are one or more workpiece features that are occluding at least a portion of the target feature in the 3D view. If there are no occluding workpiece features, the routine ends. If it is determined that there are one or more occluding workpiece features, the routine proceeds to a block 740, where the one or more occluding workpiece features that would otherwise be occluding at least a portion of the target feature in the 3D view are automatically rendered as at least partially transparent in the 3D view.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

The disclosure of U.S. provisional patent application Ser. No. 62/611,833, filed Dec. 29, 2017, is incorporated herein in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for programming workpiece feature inspection operations for a coordinate measuring machine (CMM), the CMM including at least one sensor used for determining workpiece feature measurement data, and a stage for holding a workpiece wherein at least one of the sensor or the stage are movable relative to one another, the system comprising:
- a computer-aided design (CAD) file processing portion which is part of a programming portion and which inputs a workpiece CAD file corresponding to a workpiece and analyzes the file to automatically determine inspectable workpiece features on the workpiece corresponding to a plurality of geometric feature types; and
- a user interface comprising:
  - a workpiece inspection program simulation portion which is included in a three dimensional (3D) view window and which comprises a 3D view including at least one of workpiece features on the workpiece or inspection operation representations corresponding to inspection operations to be performed on workpiece features according to a current workpiece feature inspection plan; and
  - an editing user interface portion which is included in at least one of a plan view window or a program view window and which comprises an editable plan representation of the current workpiece feature inspection plan for the workpiece corresponding to the CAD file, the editable plan representation comprising at least one of workpiece features or inspection operation representations;

wherein:
- the system is configured to automatically perform a set of transparency operations in response to a feature-directed operation included in a first set of feature-directed operations;
- the first set of feature-directed operations comprises:
  - a selection operation for a workpiece feature or an inspection operation representation in the editable plan representation;
- the set of transparency operations that is automatically performed in response to the feature directed operation comprises:
  - automatically identifying as a current target feature a workpiece feature in the 3D view that corresponds to a workpiece feature or inspection operation representation that is selected in the editable plan representation by the selection operation, wherein the selection operation is a current feature-directed operation;
  - automatically determining that a first occluding workpiece feature is occluding at least a portion of the current target feature in the 3D view;
  - in response to the determination that the first occluding workpiece feature is occluding at least part of the target feature in the 3D view, automatically rendering as at least partially transparent in the 3D view the first occluding workpiece feature; and
  - when the current feature-directed operation is terminated, automatically terminating the transparency operations associated with the current target feature in the 3D view; and
- the current workpiece feature inspection plan comprises at least one of measuring or touching a sampling point on the current target feature, using a CMM measuring probe, and for which the sampling point on the current target feature is made to be visible in the 3D view by the automatic rendering of the first occluding workpiece feature as at least partially transparent.

2. The system of claim 1, wherein at least some non-occluding features in the 3D view are not automatically rendered as transparent by the automatically performed transparency operations.

3. The system of claim 1, wherein the transparency operations further comprise automatically rendering as at least partially transparent in the 3D view a foreground portion of the current target feature in the 3D view that would otherwise be occluding at least a background portion of the current target feature in the 3D view.

4. The system of claim 1, wherein the first set of feature-directed operations further comprises inspection operations performed on workpiece features as part of the current workpiece feature inspection plan.

5. The system of claim 4, wherein when an inspection operation is performed or selected, a workpiece feature that the inspection operation is directed to is automatically identified as a current target feature by the transparency operations.

6. The system of claim 5, wherein the inspection operation that is performed or selected is included in an inspection sequence, and comprises at least one of measuring or touching a sampling point on the workpiece feature that the inspection operation is directed to, using a CMM measuring probe.

7. The system of claim 4, wherein when an inspection operation is automatically performed as part of an active program simulation, a workpiece feature that the inspection operation is performed on is automatically identified as a current target feature by the transparency operations.

8. The system of claim 4, wherein when an inspection operation is performed as part of manually or semi-automatically stepping through a program simulation, a workpiece feature that the inspection operation is performed on is automatically identified as a current target feature by the transparency operations.

9. The system of claim 1, wherein the first occluding workpiece feature is occluding the entire current target feature in the 3D view such that no portion of the current target feature is visible to be selectable in the 3D view before the first occluding workpiece feature is automatically rendered as at least partially transparent by the transparency operations.

10. The system of claim 1, wherein the transparency operations further comprise automatically rendering as at least partially transparent in the 3D view a second occluding workpiece feature that would otherwise be occluding at least a portion of the current target feature in the 3D view.

11. The system of claim 1, wherein the workpiece feature or inspection operation representation that is indicated by the current feature-directed operation is an inspection operation representation that comprises at least one of a sampling point, movement or angle.

12. The system of claim 1, wherein the current feature-directed operation is a selection operation that comprises a positioning of a selection indicator relative to the at least one workpiece feature or inspection operation representation in the editable plan representation and a performance of a selection action for selecting the at least one workpiece feature or inspection operation representation in the editable plan representation.

13. The system of claim 1, wherein the first set of feature-directed operations further comprises a hover operation that comprises a positioning of a selection indicator relative to the at least one workpiece feature or inspection operation representation in the editable plan representation and a hovering of the selection indicator for at least a specified period of time relative to the at least one workpiece feature or inspection operation representation.

14. The system of claim 1, wherein the first set of feature-directed operations further comprises a pass-over operation that comprises a moving of a selection indicator to pass over the at least one workpiece feature or inspection operation representation in the editable plan representation.

15. The system of claim 1, wherein the user interface further comprises a simulation status portion that comprises a current time indicator that moves along a graphical total time range element to characterize a state of progress through the current workpiece feature inspection plan corresponding to the currently displayed 3D view and to the corresponding state of progress through the editable plan representation.

16. The system of claim 15, wherein the position of the current time indicator along the graphical total time range element is adjustable by a user, and the current feature-directed operation comprises a selection operation that comprises a selection or adjustment of the position of the current time indicator by the user, wherein the workpiece feature or inspection operation representation that is indicated by the current feature-directed operation is the workpiece feature or inspection operation representation that corresponds to the state of progress through the editable plan representation.

17. The system of claim 1, wherein the transparency operations do not include rotating or otherwise adjusting the orientation of the 3D view after the current target feature is identified.

18. A system for programming workpiece feature inspection operations for a coordinate measuring machine (CMM), the system comprising:
a user interface comprising:
a workpiece inspection program simulation portion which is included in a three dimensional (3D) view window and which comprises a 3D view including workpiece features on the workpiece; and
an editing user interface portion which is included in at least one of a plan view window or a program view window and which comprises an editable plan representation of a current workpiece feature inspection plan for performing inspection operations on a workpiece, the editable plan representation comprising at least one of workpiece features or inspection operation representations;
wherein:
the system is configured to be automatically responsive to a selection operation comprising a selection of at least one workpiece feature or inspection operation representation in the editable plan representation;
the response to the selection operation comprises:
automatically designating as a target feature a workpiece feature in the 3D view that corresponds to at least one workpiece feature or inspection operation representation that is selected in the editable plan representation by the selection operation;
automatically determining that a first occluding workpiece feature is occluding at least a portion of the target feature in the 3D view;
in response to the determination that the first occluding workpiece feature is occluding at least part of the target feature in the 3D view, automatically rendering as at least partially transparent in the 3D view the first occluding workpiece feature; and
the current workpiece feature inspection plan comprises at least one of measuring or touching a sampling point on the target feature, using a CMM measuring probe, and for which the sampling point on the target feature is made to be visible in the 3D view by the automatic rendering of the first occluding workpiece feature as at least partially transparent.

19. The system of claim 18, wherein the selection operation comprises at least one of:
a positioning of a selection indicator relative to the at least one workpiece feature or inspection operation representation in the editable plan representation and a performance of a selection action for selecting the at least one workpiece feature or inspection operation representation;
a positioning of a selection indicator relative to the at least one workpiece feature or inspection operation representation in the editable plan representation and a hovering of the selection indicator for at least a specified period of time relative to the at least one workpiece feature or inspection operation representation; or
a moving of a selection indicator to pass over the at least one workpiece feature or inspection operation representation in the editable plan representation.

20. A computer implemented method for operating a programming system for programming workpiece feature inspection operations for a coordinate measuring machine (CMM),
the programming system comprising:
a user interface comprising:
a workpiece inspection program simulation portion which is included in a three dimensional (3D) view window and which comprises a 3D view including workpiece features on the workpiece; and
an editing user interface portion which is included in at least one of a plan view window or a program view window and which comprises an editable plan representation of a current workpiece feature inspection plan for performing inspection operations on a workpiece, the editable plan representation comprising at least one of workpiece features or inspection operation representations;
the method comprising:
under control of one or more computing systems of the programming system configured with executable instructions,
determining that a selection has been made for selecting at least one workpiece feature or inspection operation representation in the editable plan representation;
in response to the determination that the selection has been made in the editable plan representation, automatically designating as a target feature a first workpiece feature in the 3D view that corresponds to the selected at least one workpiece feature or inspection operation representation in the editable plan representation;

automatically determining that a second workpiece feature is occluding at least a portion of the target feature in the 3D view; and in response to the determination that the second workpiece feature is occluding at least a portion of the target feature in the 3D view, automatically rendering as at least partially transparent the second workpiece feature in the 3D view;

wherein the current workpiece feature inspection plan comprises at least one of measuring or touching a sampling point on the target feature, using a CMM measuring probe, and for which the sampling point on the target feature is made to be visible in the 3D view by the automatic rendering of the second workpiece feature as at least partially transparent.

21. The computer implemented method of claim 20, further comprising:

in response to a selection of a third workpiece feature in the editable plan representation, no longer designating the first workpiece feature as the target feature, and no longer rendering the second workpiece feature as at least partially transparent in the 3D view.

\* \* \* \* \*